United States Patent [19]

Okami et al.

[11] Patent Number: 5,216,104
[45] Date of Patent: Jun. 1, 1993

[54] CURABLE SILICONE RUBBER COMPOSITIONS AND PRODUCTS OF CURING THEREOF

[75] Inventors: Takehide Okami, Annaka; Hironao Fujiki, Takasaki, both of Japan

[73] Assignee: Shin-Etsu Chemical Co., Ltd., Tokyo, Japan

[21] Appl. No.: 553,454

[22] Filed: Jul. 17, 1990

[30] Foreign Application Priority Data

Jul. 21, 1989 [JP] Japan ................. 1-187278

[51] Int. Cl.$^5$ .............................. C08G 77/06
[52] U.S. Cl. ...................... 528/15; 525/478; 524/425; 524/430; 524/431; 524/432; 524/440; 524/588; 524/448; 524/788; 524/789; 524/785; 524/786; 524/780; 524/783; 524/862
[58] Field of Search ............ 528/15, 36; 525/478; 524/862, 448, 425, 430, 431, 432, 440, 588, 788, 789, 785, 786, 783, 780

[56] References Cited

U.S. PATENT DOCUMENTS

| | | | |
|---|---|---|---|
| 4,029,629 | 6/1977 | Jeram | 528/15 |
| 4,041,010 | 8/1977 | Jeram | 528/15 |
| 4,087,585 | 5/1978 | Schulz | 428/429 |
| 4,196,273 | 4/1980 | Imai et al. | 528/32 |
| 4,990,560 | 2/1991 | Ikeno et al. | 528/15 |

*Primary Examiner*—Melvyn I. Marquis
*Attorney, Agent, or Firm*—Finnegan, Henderson, Farabow, Garrett & Dunner

[57] ABSTRACT

An addition-type silicone rubber composition comprising (a) an organopolysiloxane containing at least two alkenyl groups bonded to the silicon atoms in one molecule, (b) an organopolysiloxane containing one alkenyl group bonded to the silicon atom in one molecule on an average, (c) an organohydrogenpolysiloxane containing at least two hydrogen atoms bonded to the silicon atoms, (d) a platinum catalyst; and a product of curing the composition. This silicone rubber composition can give a low-modulus silicone rubber by curing which neither contaminates the material in contact therewith nor deforms owing to shrinkage, without hindering the adhesion of the composition during its curing stage.

11 Claims, No Drawings

CURABLE SILICONE RUBBER COMPOSITIONS AND PRODUCTS OF CURING THEREOF

BACKGROUND OF THE INVENTION

The present invention relates to a curable silicone rubber composition and a product of curing thereof, particularly to an addition-type silicone rubber composition which can give a low-modulus silicone rubber by curing and a product of curing thereof.

A method for producing an elastomer by the addition reaction of an organopolysiloxane containing at least two alkenyl groups such as vinyl groups bonded to the silicon atoms with an organohydrogenpolysiloxane containing at least two hydrogen atoms bonded to the silicon atoms in the presence of a platinum catalyst is well known, and so is a process wherein an inorganic filler is added to improve the flame retardance, mechanical strengths or chemical resistance of the elastomer.

Further, it is known that the modulus of a cured silicone rubber can be lowered by adding a nonfunctional oil, such as nonfunctional silicone oil.

Although the cured rubber exhibits a lowered hardness and modulus, a silicone rubber composition containing a nonfunctional oil has several disadvantages. The oil tends to bleed on the surface of the product of curing of the composition, and thus it contaminates the material in contact therewith or causes deformation due to shrinkage. It is also noticed that the adhesion of the composition is hindered during its curing stage. These disadvantages occur even when an addition-type silicone gel not containing any filler is used instead of the above silicone rubber.

Meanwhile, there is known another method for lowering the modulus of a cured silicone rubber by reducing the amount of the inorgnaic filler to be added thereto. However, by this method the strengths of the cured rubber are so lowered that the use application of the cured rubber is limited to a special field such as potting.

SUMMARY OF THE INVENTION

It is therefore the object of the present invention is to provide a curable silicone rubber composition which can be cured to give a low-modulus silicone rubber which neither contaminates the material in contact therewith nor deforms owing to shrinkage, without hindering the adhesion of the composition during its curing stage, and a product of curing thereof.

The inventors of the present invention have intensively examined and found that if an organopolysiloxane containing one alkenyl group bonded to the silicon atom in one molecule on an average is included in an addition-type silicone rubber composition comprising an organopolysiloxane containing at least two alkenyl groups bonded to the silicon atoms, and organohydrogenpolysiloxane containing at least two hydrogen atoms bonded to the silicon atoms, and a platinum catalyst, the thus-produced addition-type curable silicone rubber composition can attain the above object.

The addition-type curable silicone rubber composition of the present invention will comprise:

(a) 100 parts by weight of an organopolysiloxane containing at least two alkenyl groups bonded to the silicon atoms in one moleucle, (b) 3 to 70 parts by weight of an organopolysiloxane containing one alkenyl group bonded to the silicon atom in one molecule on an average, (c) an organohydrogenpolysiloxane containing at least two hydrogen atoms bonded to the silicon atoms in one molecule in an amount to provide 0.5 to 5 hydrogen atoms bonded to the silicon atoms per one alkenyl group of the components (a) and (b), (d) a catalytic amount of platinum or a platinum compound.

DETAILED DESCRIPTION OF THE INVENTION

The organopolysiloxane to be used as the component (a) in the present invention must have at least two alkenyl groups having from 2 to 6 carbon atoms bonded to the silicon atoms in one molecule. The alkenyl group includes vinyl, allyl, methallyl and hexenyl groups, and vinyl and allyl groups are preferable.

The organic groups other than the alkenyl groups are unsubstituted or substituted hydrocarbon groups having from 1 to 10, preferably 1 to 8, carbon atoms selected from among, for example, methyl, ethyl, propyl, trifluoropropyl and phenyl groups. Examples of the organopolysiloxane to be used as the component (a) are as follows:

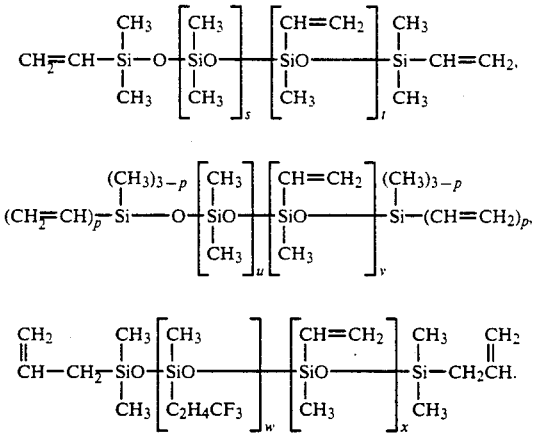

wherein p is 2 or 3; s, u and w are each a positive integer; and t, v and x are each 0 or a positive integer.

The structure of the organopolysiloxane to be used as the component (a) may be somewhat branched, though it is generally linear. These organopolysiloxanes may be used alone or as a mixture of two or more of them. Although the viscosity of this organopolysiloxane is not particularly limited, it is practically preferable from the standpoint of blendability to use an organopolysiloxane having a viscosity of 100 to 1,000,000 cSt at 25° C.

The organopolysiloxane to be used as the component (b) in the present invention must contain one alkenyl group having from 2 to 6 carbon atoms bonded to the silicon atom in one molecule on an average. The alkenyl group includes vinyl, allyl, methallyl and hexenyl groups, and vinyl and allyl groups are preferable. The organic groups other than the alkenyl group may be unsubstituted or substituted hydrocarbon groups having from 1 to 10, preferably from 1 to 8, carbon atoms, selected from among, for example, methyl, ethyl, propyl, trifluoropropyl and phenyl groups. Examples of the organopolysiloxane to be used as the component (b) are as follows:

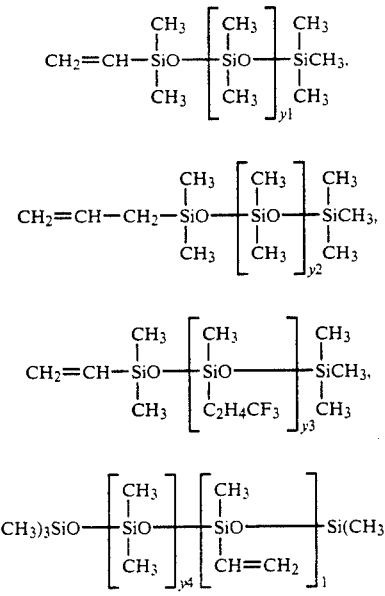

wherein y1, y2, y3 and y4 are each 0 or a positive integer.

The structure of the organopolysiloxane to be used as the component (b) may be somewhat branched, though it is generally linear.

Although the viscosity of this organopolysiloxane is not particularly limited, it is practically preferable from the standpoint of blendability to use an organopolysiloxane having a viscosity of 20 to 200,000 cSt.

Although any of the ogrnopolysiloxanes mentioned above as the component (b) can be used alone, a mixture of two or more of them may also be used. The component (b) is effective in lowering the modulus of the product of curing of the curable silicone rubber composition according to the present invention and enhancing the penetration thereof.

Since the component (b) is incorporated into the crosslinked structure of the silicone rubber composition by virtue of the reaction of the alkenyl groups caused in the curing of the composition, the component (b) does not bleed on the surface of the cured rubber unlike the nonfunctional oil of the prior art, so that it neither contaminates the material in contact therewith nor causes shrinkage even after a long-term use.

As described above, the component (b) serves to lower the crosslinking density of the composition, and thereby attains an improvement in the flexibility and a lowering in the hardness. It is preferable to add the component (b) in an amount of 3 to 70 parts by weight, particularly 5 to 50 parts by weight to 100 parts by weight of the component (a).

The organohydrogenpolysiloxane to be used as the component (c) in the present invention serves as a crosslinking agent for the crosslinking reactions between components (a) and those between components (a) and (b). It must contain at least two $\equiv$SiH bonds in one molecule. The structure of the organohydrogenpolysiloxane may be any of the linear, branched, cyclic and network ones and particular examples thereof are as follow:

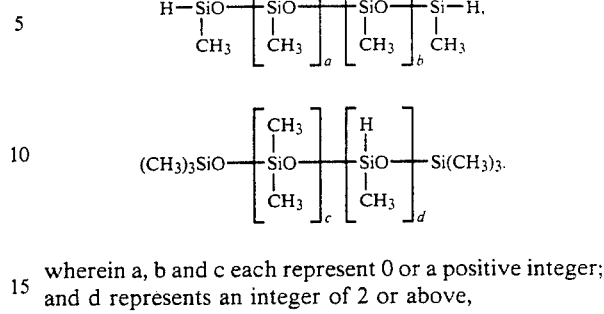

wherein a, b and c each represent 0 or a positive integer; and d represents an integer of 2 or above,

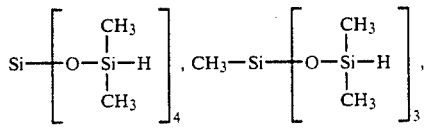

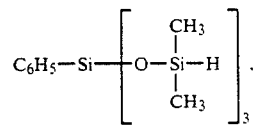

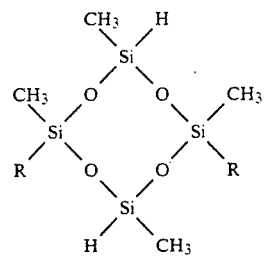

wherein R represents a hydrogen atom or a methyl, propyl or trimethylsilanol group, and

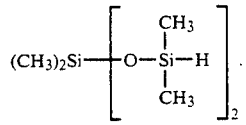

Although the polymerization degree of the organohydrogenpolysiloxane as the component (c) is not particularly limited, an organohydrogenpolysiloxane having less than 300, preferably from 3 to 200 silicon atoms in one molecule.

In using an organohydrogenpolysiloxane containing two $\equiv$Si—H bonds in one molecule, i.e., a so-called difunctional organohydrogenpolysiloxane as the component (c), it is preferable that an at least trifunctional organohydrogenpolysiloxane be simultaneously used (see Japanese Patent Kokoku Publication No. 40447/1972) or that the components (a) and/or (b) be an organopolysiloxane having an at least trifunctional silicon-bonded alkenyl group.

The organohydrogenpolysiloxane (c) must be used in an amount to provide 0.5 to 5, preferably 1.0 to 3.0 hydrogen atoms directly bonded to the silicon atoms of the component (c) per one alkenyl group of the components (a) and (b).

The platinum or platinum compound to be used as the component (d) in the present invention serves to cause the addition reaction of the silicon-bonded alkenyl group of the components (a) and (b) with the ≡SiH group of the component (c), and may be suitably selected from among known platinum catalysts.

The catalyst includes not only platinum black but also platinum supported on alumina, silica or the like, chloroplatinic acid, alcohol-modified chloroplatinic acid and reaction products, complexes and mixtures of chloroplatinic acid with olefins or vinylsiloxanes. Solid catalysts are preferably finely divided or supported on a carrier having a small particle size and a relatively large surface area for the purpose of improving the dispersibility thereof.

The amount of the platinum catalyst may be suitably selected so as to attain a desired curing rate. It is preferable from the standpoint of economic efficiency and the quality of the product of curing that the amount of the catalyst (in terms of metallic platinum) based on the total amount of the components (a) and (b) range from 1 to 200 ppm with respect to a siloxane-compatible catalyst such as alcohol- or siloxane-modified chloroplatinic acid, and from 20 to 500 ppm with respect to a solid catalyst such as platinum black.

Although the composition of the present invention must contain the above components (a) and (d) as essential components, it may further contain up to 600 parts by weight of an inorganic filler as component (e) per 100 parts by weight of the component (a) for the purpose of reducing the heat shrinkage of the composition in the curing, lowering the coefficient of thermal expansion of the cured elastomer, improving the heat stability, weathering resistance, chemical resistance, flame retardance and mechanical strengths thereof and also lowering the gas permeability thereof.

Examples of the above filler include particulate aerosil comprising silica as a main component, hydrophobic silica, wet process silica, diatomaceous earth, quartz powder such as crystallite, calcium carbonate, alumina, iron oxide, zinc oxide, titanium oxide, magnesium carbonate, cerium oxide, carbon black, graphite, silver powder and nickel powder. Among these fillers, aerosil is preferably used in an amount of at most 25 parts by weight per 100 parts by weight of the component (a), while alumina is preferably used in an amount of 300 to 500 parts by weight. Thus, the amount of the filler to be added must be suitably selected depending upon the oil adsorption, surface area or specific gravity of the filler.

The composition of the present invention can be easily prepared by homogeneously blending the above components (a) and (d) and, if necessary, further the component (e).

If necessary, the composition of the present invention may further contain various additives. For example, it may contain an organopolysiloxane of a resin structure comprising $SiO_2$ units, $(CH_2=CH)-(R')_2SiO_{0.5}$ units and $R'_3SiO_{0.5}$ units (wherein R' is a monovalent hydrocarbon group except for unsaturated aliphatic hydrocarbon groups) (see Japanese Patnet Kokoku Publication Nos. 26771/1963 and 9476/1970) for the purpose of enhancing the strengths of the cured elastomer. Further, it may contain an organopolysiloxane comprising $(CH_2=CH)R''SiO$ units (wherein R" is the same as defined with respect to the above R')(see Japanese Patent Kokoku Publication No. 10947/1973), and acetylene compound (see U.S. Pat. No. 3,445,420) or a heavy metal ionic compound (see U.S. Pat. No. 3,532,649) for the purpose of controlling the curing rate of the composition.

The product of curing of the curable silicone rubber composition according to the present invention is useful not only as silicone gel or material for low-hardness rolls but also as potting material or adhesive sealant for electronic components to be used in a place undergoing vigorous impact and vibration such as automobile, thus being useful in a remarkably widened field as compared with that of the prior art.

The curable silicone rubber composition of the present invention not only is excellent in high-temperature impact resistance and flexibility but also does not contaminates the material in contact therewith. Further, the cured silicone rubber does not cause deformation or dimensional change due to shrinkage even after a long-term use. Further, the adhesion of the composition is not hindered in the curing, because there is nothing which bleeds to the interface of adhesion.

The present invention will now be described in more detail by referring to the following Examples. In the Examples, all parts are by weight and all viscosity values are those determined at 25° C.

EXAMPLE 1

100 parts of dimethylpolysiloxane blocked with dimethylvinylsilyl groups at both terminals and having a viscosity of 5,000 cSt and 20 parts of fumed silica having a surface made hydrophobic with trimethylsilyl groups and a specific surface area of 200 m²/g were treated in a kneader under heating at 150° C. for 2 hours and cooled to a room temperature. Then, 15 parts of dimethylpolysiloxane blocked with a dimethylvinylsilyl group at one terminal and with a trimethylsilyl group at the other terminal and having a viscosity of 800 cSt, 0.02 part of an octanol solution of chloroplatinic acid containing a 2% by weight of platinum and 0.005 part of 3-methyl-3-hydroxy-1-butyne as a regulator were added, and blended together homogeneously. To this mixture 2.8 parts of an organohydrogenpolysiloxane represented by the average formula was added to prepare Composition I.

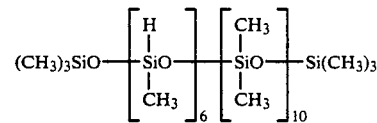

This composition was cured by heating at 150° C. for 30 minutes to give a sheet having a thickness of 2 mm, which was examined for physical properties as a rubber according to JIS K 6301 to give the results of Table 1.

In order to determine the bleeding of free oil from the composition, 5.0 g of the composition was placed on a filter paper No. 5 A, cured by heating at 150° C. for 30 minutes and allowed to stand at 25° C. for 24 hours to measure the length of the area of the filter impregnated with the oil. This length was given in Table 1 as an indication of the oil bleeding. As shown in Table 1, no bleeding was observed.

TABLE 1

| Items | Composition 1 | Comparative composition A | Comparative composition B |
| --- | --- | --- | --- |
| hardness | 32 | 40 | 32 |

TABLE 1-continued

| Items | Composition I | Comparative composition A | Comparative composition B |
| --- | --- | --- | --- |
| (JIS A) elongation (%) | 520 | 420 | 510 |
| tensile strength (Kgf/cm$^2$) | 33 | 35 | 31 |
| oil bleeding (mm) | 0 | 0 | 3 |

COMPARATIVE EXAMPLE 1

Comparative Composition A was prepared in the same manner as that of Example 1 except for the omission of the dimethylpolysiloxane blocked with a dimethylvinylsilyl group at one terminal as used in Example 1. The physical properties as a rubber and bleeding thereof were examined each in the same manner as those of Example 1 to give the results of Table 1.

COMPARATIVE EXAMPLE 2

Comparative Composition B was prepared in the same manner as that of Example 1 except that 10 parts of a nonfunctional dimethylpolysiloxane blocked with trimethylsilyl groups at both terminals and having a viscosity of 1,800 cSt was used instead of the dimethylpolysiloxane blocked with a dimethylvinylsilyl group at one terminal (15 parts).

The composition was examined for physical properties as a rubber and bleeding each in a similar manner to that of Example 1 to give the results Table 1.

It has been confirmed based on the results given in Table 1 that the composition of the present invention can be cured to give a product having a hardness equivalent to that of the Comparative Example 2 without causing oil bleeding.

EXAMPLE 2

100 parts of dimethylpolysiloxane blocked with dimethylvinylsilyl groups at both terminals, containing one unit of the formula:

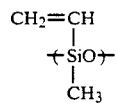

in one molecule and having a viscosity of 10,000 cSt, 150 parts of wet process silica having a mean particle diameter of 2 μm, 0.03 part of the same octanol solution of chloroplatinic acid as that used in Example 1, 10 parts of dimethylpolysiloxane containing one unit of the formula:

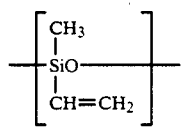

in one molecule, blocked with trimethylsilyl groups at both terminals and having a viscosity of 100 cSt and 0.05 part of 3-methyl-3-hydroxy-1-butyne as a regulator were blended together homogeneously, followed by the addition of 2.1 parts of an organohydrogenpolysiloxane represented by the average formula:

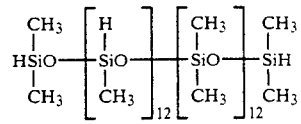

to prepare composition II.

This composition II was examined for physical properties as a rubber and bleeding each in a similar manner to that of Example 1. Further, the composition was molded into a roll having a wall thickness of 3 mm and an outer diameter of 30 mm and this roll was set in a dry copying machine. The diameter of the roll was determined after the passing of 30,000 sheets of paper through the machine. Although the diameter was reduced from 30.00 mm (initial value) to 29.91 mm, the reduction was very slight. The results are given in Table 2.

COMPARATIVE EXAMPLE 3

Comparative Composition C was prepared in the same manner as that of Example 2 except for the omission of the dimethylpolysiloxane containing one unit of the formula:

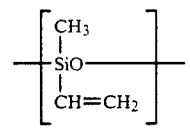

in one molecule and blocked with trimethylsilyl groups at both terminals as used in Example 2.

The obtained composition C was examined for the same items as those of Example 2 to give the results of Table 2.

COMPARATIVE EXAMPLE 4

Comparative Composition D was prepared in the same manner as that of Example 2 except that 7 parts of a trimethylsilyl-blocked nonfunctional dimethylpolysiloxane and having a viscosity of 100 cSt was used instead of the dimethylpolysiloxane containing one unit of the formula:

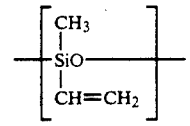

in one molecule and blocked with trimethylsilyl groups at both terminals (10 parts).

The obtained composition D was examined for the same items as those of Example 2 to give the results of Table 2.

TABLE 2

| Items | Composition II | Comparative composition C | Comparative composition D |
| --- | --- | --- | --- |
| hardness (JIS A) | 34 | 38 | 35 |
| elongation | 220 | 180 | 240 |

TABLE 2-continued

| Items | Composition II | Comparative composition C | Comparative composition D |
|---|---|---|---|
| (%) | | | |
| tensile strength (Kgf/cm$^2$) | 15 | 20 | 13 |
| oil bleeding (mm) | 0 | 0 | 4 |
| dimensional change of molding product (change in roll diameter: mm) | 0.09 | 0.05 | 0.86 |

EXAMPLE 3

100 parts of dimethylpolysiloxane blocked with dimethylvinylsilyl groups at both terminals, containing one unit of the formula:

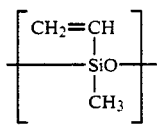

in one molecule and having a viscosity of 10,000 cSt, 350 parts of alumina powder having a mean particle diameter of 5 μm, 0.05 part of the same octanol solution of chloroplatinic acid as that used in Example 1, 20 parts of the same dimethylpolysiloxane blocked with a dimethylvinylsilyl group at One terminal and with a trimethylsilyl group of the Other terminal and having a viscosity of 800 cSt as that used in Example 1 and 0.05 part of 3-methyl-3-hydroxy-1-butyne as a regulator were blended together homogeneously, followed by the addition of 3.2 parts of an organohydrogenpolysiloxane represented by the average formula:

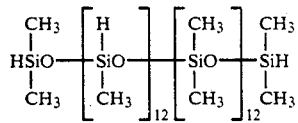

to prepare Composition III.

The obtained composition III was examined for physical properties as a rubber in a similar manner to that of Example 1 to give the results of Table 3.

COMPARATIVE EXAMPLE 5

Comparative Composition E was prepared in the same manner as that of Example 3 except for the omission of the dimethylpolysiloxane blocked with a dimethylvinylsilyl group at one terminal and with a trimethylsilyl group at the other terminal as used in the Example 3.

The obtained composition E was examined for the same items as those of Example 3 to give the results of Table 3.

It has been confirmed based on the results given in Table 3 that the product of curing of the composition according to the present invention exhibits a lowered hardness and a lowered modulus.

TABLE 3

| Items | Composition III | Comparative composition E |
|---|---|---|
| hardness (JIS A) | 65 | 80 |
| elongation (%) | 120 | 70 |
| tensile strength (Kgf/cm$^2$) | 45 | 45 |
| 50% modulus (Kgf/cm$^2$) | 18 | 30 |

EXAMPLE 4

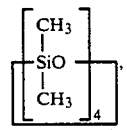

300 g of
5.1 g of

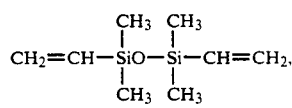

and 4.4 g of (CH$_3$)$_3$SiOSi(CH$_3$)$_3$ were fed into a flask, followed by the addition of 0.65 g of 10% potassium siliconate and the contents were kept at 120° C. for 3 hours to carry out equilibration. The obtained reaction mixture was neutralized, subjected to stripping and filtered to give 290 g of dimethylpolysiloxane A represented by the average composition formula:

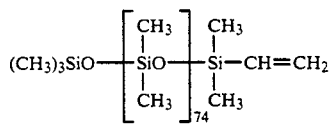

containing one vinyl group in one molecule on an average and having a viscosity of 100 cSt.

Then, 100 parts of dimethylpolysiloxane blocked with dimethylvinylsilyl groups at both terminals and having a viscosity of 5,000 cSt and 15 parts of tumed silica having a surface made hydrophobic with trimethylsilyl groups and a specific surface area of 300 m$^2$/g were treated together in a kneader under heating at 150° C. for 2 hours and cooled to a room temperature. Then 20 parts of the above dimethylpolysiloxane A, 0.02 part of an octanol solution of chloroplatinic acid containing 2% by weight of platinum and 0.005 part of 3-methyl-3-hydroxy-1-butyne as a regulator were added, and blended together homogeneously. To this mixture 1.7 parts of an organohydrogenpolysiloxane represented by the average formula was added to prepare Composition IV.:

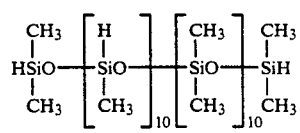

The obtained Composivion IV was examined for physical properties as a rubber and bleeding each in a similar manner to that of Example 1 to give the results of Table 4.

TABLE 4

| Items | Composition IV | Composition V | Comparative composition F | Comparative composition G |
|---|---|---|---|---|
| hardness (JIS A) | 28 | 28 | 25 | 28 |
| elongation (%) | 580 | 580 | 630 | 530 |
| tensile strength (Kgf/cm²) | 31 | 32 | 24 | 27 |
| oil bleeding (mm) | 1 | 0 | 8 | 6 |

EXAMPLE 5

300 g of

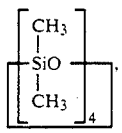

4.9 g of (CH₃)₃SiOH, 35 g of a 10% solution of n-BuLi in n-hexane, 100 ml of toluene and 30 ml of THF were fed into a flask and stirred at a room temperature, followed by the addition of 0.73 g of

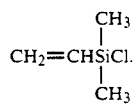

The contents were further stirred for 2 hours, subjected to stripping and filtered to give 280 g of dimethylpolysiloxane oil B represented by the formula:

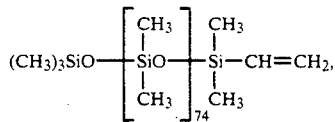

blocked with a dimethylvinylsilyl group at one terminal and with a trimethylsilyl group at the other terminal and having a viscosity of 100 cSt.

Then, Composition V was prepared in the same manner as that of Example 4 except that the above dimethylpolysiloxane B was used instead of the dimethylpolysiloxane A.

The obtained composition was examined for physical properties as a rubber and bleeding each in a similar manner to that of Example 1 to give the results Table 4.

COMPARATIVE EXAMPLE 6

Comparative Composition F was prepared in the same manner as that of Example 4 except that 20 parts of a nonfunctional dimethylpolysiloxane blocked with trimethylsilyl groups at both terminals and having a viscosity of 100 cSt was used instead of the dimethylpolysiloxane A and examined for physical properties as a rubber and bleeding each in a similar manner to that of Example 4. The results are given in Table 4.

COMPARATIVE EXAMPLE 7

Comparative Composition G was prepared in the same manner as that of Example 5 except that 10 parts of a nonfunctional dimethylpolysiloxane blocked with trimethylsilyl groups at both terminals and having a viscosity of 100 cSt was used instead of the dimethylpolysiloxane B.

The obtained composition G was examined for physical properties as a rubber and bleeding each in a similar manner to that of Example 5 to give the results of Table 4.

It has been confirmed based on the results given in Table 4 that the composition of the present invention can be cured to give a product which is free from oil bleeding while retaining a low hardness.

What is claimed is:

1. An addition-type curable silicone rubber composition comprising:
   (a) 100 parts by weight of an organopolysiloxane or organopolysiloxanes containing at least two alkenyl groups bonded to the silicon atoms in one molecule,
   (b) 3 to 70 parts by weight of an organopolysiloxane or organopolysiloxanes containing one alkenyl group bonded to the silicon atom in one molecule on an average,
   (c) an organohydrogenpolysiloxane containing at least two hydrogen atoms bonded to the silicon atoms in one molecule in an amount to provide 0.5 to 5 hydrogen atoms bonded to the silicon atoms per one alkenyl group of the components (a) and (b),
   (d) a catalytic amount of platinum or a platinum compound.

2. The silicone rubber composition as defined in claim 1 further comprising an inorganic filler in an amount not exceeding 600 parts by weight per 100 parts by weight of the component (a).

3. The silicone rubber composition as defined in claim 1 wherein the amount of the organopolysiloxane or organopolysiloxanes of component (b) is 5 to 50 parts by weight per 100 parts by weight of the component (a).

4. The silicone rubber composition as defined in claim 1 wherein the amount of the organohydrogenpolysiloxane of the component (c) is chosen to provide 1.0 to 3.0 hydrogen atoms bonded to the silicon atoms per one alkenyl group of the components (a) and (b).

5. The silicone rubber composition as defined in claim 1 wherein the organopolysiloxane or organopolysiloxanes of the component (a) is an organopolysiloxane or organopolysiloxanes of substantially straight-chain molecular structure having a viscosity within the range between 100 and 1,000,000 cSt at 25° C., and the remaining groups bonded to the silicon atoms are unsubstituted or substituted monovalent hydrocarbon groups.

6. The silicone rubber composition as defined in claim 1 wherein the organopolysiloxane or organopolysiloxanes of the component (b) is an organopolysiloxane or organopolysiloxanes of substantially straight-chain molecular structure having a viscosity within the range between 20 and 200,000 cSt at 25° C., and the remaining groups bonded to the silicon atoms are unsubstituted or substituted monovalent hydrocarbon groups.

7. The silicone rubber composition as defined in claim 1 or 5 wherein the alkenyl group of the organopolysiloxane or orqanopolysiloxanes of the component (a) is a vinyl or allyl group.

8. The silicone rubber composition as defined in claim 1 or 6 wherein the alkenyl group of the organopolysiloxane or organopolysiloxanes of the component (b) is a vinyl or allyl group.

9. The silicone rubber composition as defined in claim 1 or 2 further comprising an organopolysiloxane of a resin structure comprising $SiO_2$ units, $(CH_2=CH)(R')_2SiO_{0.5}$ units, and $R'_3SiO_{0.5}$ units where $R'$ is a monovalent hydrocarbon group having no unsaturated aliphatic hydrocarbon groups.

10. The silicone rubber composition as claimed in claim 1 or 2 further comprising an organopolysiloxane comprising $(CH_2=CH)(R''SiO$ units, where $R''$ is a monovalent hydrocarbon group having no unsaturated aliphatic hydrocarbon groups, and acetylene compound or a heavy metal ionic compound for controlling the curing rate of the silicone rubber composition wherein said heavy metal ionic compound is a compound selected from the group consisting of stannous salts, mercuric salts, bismuth (+3) salts, cupric salts and cuprous salts.

11. A product of curing the silicone rubber composition as defined in claim 1 or 2.

* * * * *

UNITED STATES PATENT AND TRADEMARK OFFICE
CERTIFICATE OF CORRECTION

PATENT NO.  :  5,216,104
DATED       :  June 1, 1993
INVENTOR(S) :  Okami et al.

It is certified that error appears in the above-identified patent and that said Letters Patent is hereby corrected as shown below:

Claim 7, column 13, line 1, "orqanopolysiloxanes" should read

--organopolysiloxanes--.

Claim 10, column 14, line 3, "(R"SiO" should read --R"SiO--.

Signed and Sealed this

Eleventh Day of January, 1994

Attest:

BRUCE LEHMAN

Attesting Officer     Commissioner of Patents and Trademarks